United States Patent [19]

Rosenblatt

[11] Patent Number: 5,289,217
[45] Date of Patent: Feb. 22, 1994

[54] SYNCHRONIZED PHOTOGRAPH IDENTIFICATION

[76] Inventor: Marc Rosenblatt, 4360 N. Hills Drive, Hollywood, Fla. 33021

[21] Appl. No.: 907,607

[22] Filed: Jul. 2, 1992

[51] Int. Cl.$^5$ .................... G03B 29/00; G03B 17/00
[52] U.S. Cl. .................... 354/76; 354/289.12
[58] Field of Search ............ 354/289.12, 76, 105, 354/106

[56] References Cited

U.S. PATENT DOCUMENTS

| | | |
|---|---|---|
| 3,488,753 | 1/1970 | Tone et al. ........................ 258/67 |
| 3,987,467 | 10/1976 | Cowles ............................... 354/105 |
| 4,001,592 | 1/1977 | Katz et al. ......................... 250/476 |
| 4,123,767 | 10/1978 | Halpern ............................. 354/107 |
| 4,217,046 | 8/1980 | Weinstein et al. ................. 354/76 |
| 4,742,369 | 5/1988 | Ishii et al. ...................... 354/76 X |
| 4,942,413 | 7/1990 | Seagram ............................ 354/173 |
| 5,160,952 | 11/1992 | Iwashita et al. .................. 354/76 |
| 5,164,751 | 11/1992 | Weyer ............................... 354/76 |
| 5,198,851 | 3/1993 | Ogawa ........................ 354/289.12 X |

Primary Examiner—Michael L. Gellner
Assistant Examiner—Jae N. Noh
Attorney, Agent, or Firm—McHale & Slavin

[57] ABSTRACT

A photograph identification system is disclosed for use in recording descriptions and other pertinent information pertaining to a particular photograph. The identification system employs a data entry device having a keyboard input for recording alpha/numeric information. The data entry device is attached the camera and is capable of receiving a signal from the camera flash terminal for indexing of the recorded information. The camera operator inputs information at the time the photograph is taken and the information is stored in a memory module. The memory module is later made available for printing out of the information, preferably on labels for permanent identification of photographs developed from processing of the camera film.

2 Claims, 4 Drawing Sheets

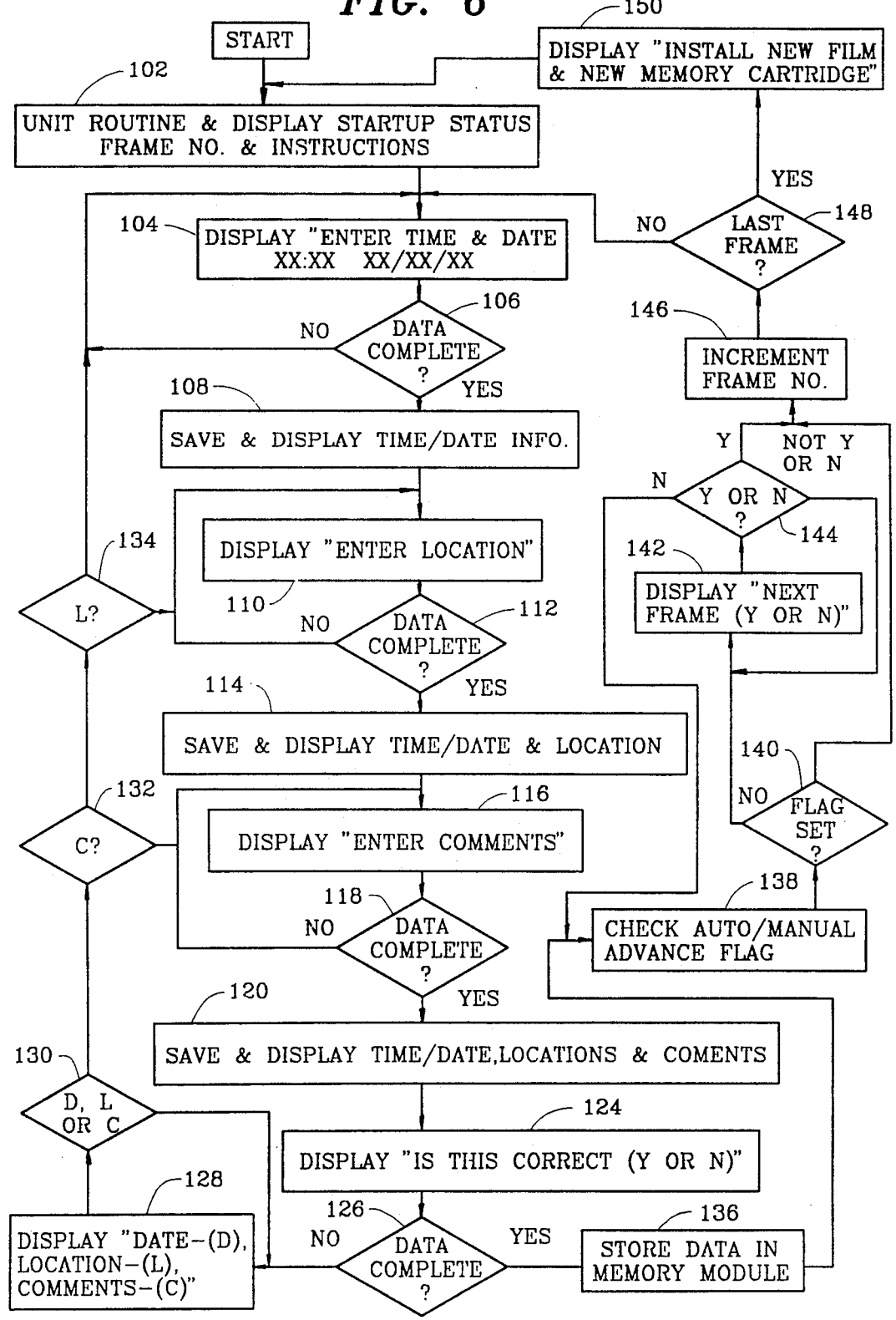

SYNCHRONIZED PHOTOGRAPH IDENTIFICATION

BACKGROUND OF THE INVENTION

Field of the Invention

The present invention relates to photographic print identification and, more particularly, to an identification device coupled to, and operatively associated with a conventional camera for information recording and subsequent labeling of photographic prints.

Background

Photography is an invaluable tool capable of capturing an event in time for generations of enjoyment. The photo produced by a camera which uses a light excluding enclosure containing an aperture and an optical lens. Light that passes through the aperture is focused by the lens to form an image on light sensitive material within the enclosure. The light sensitive material or film is typically cellulose acetate or cellulose nitrate coated with a light sensitive emulsion used to make negatives. Through a developing process the negative produces a final print or photograph of the event.

Despite the tremendous benefits afforded by photography, unless the photographer is available for explanation, the resulting photograph is of little use if no one knows what the photograph depicts. Even if the photographer is available, if a large number of pictures are taken it is difficult if not impossible for the photographer to accurately remember the significance of each photograph taken. This is especially true when there is a time lapse between the taking of the photograph and the subsequent showing of the photograph.

Whether the photo is used to record historical events or simply family memories, the importance of recording the event cannot be understated. For this reason, a number of devices have been developed in an attempt to provide subsequent viewers of the photograph with some form of photograph identification. For instance, major camera manufacturers provide an interchangeable back cover with a built-in data imprinting mechanism. The imprinting mechanism is capable of printing the day, month and year on the photograph at the moment of the shutter's release. Such devices have the ability to print Roman numerals for greater versatility but are limited to preprogrammed printing upon the face of the photograph.

U.S. Pat. No. 4,123,767 issued to Halpern discloses a film identification system based upon the exposure of film to a coded serial number. The result is each negative produced provides the developer with a method of identifying the film by coded number. This is useful to the developer if the film is mislaid, however, the identification provides no benefit for subsequent photograph viewers.

U.S. Pat. No. 4,942,413 issued to Saegnea discloses a camera accessory for performing a data printing operation on a film surface. This device provides a means for automatically printing the time and date a photograph was taken printed directly on the film for printing out on the finished photograph. Although this device provides date and time, printing directly on the photograph distracts from the picture and does not provide any identification of the subject matter of the photograph.

U.S. Pat. No. 4,001,592 issued to Katz discloses an X-ray film identification apparatus which also places identification of the time as well as the individual name on X-ray film. This device illustrates the need for identification of film.

Finally, U.S. Pat. No. 3,987,467 issued to Cowles discloses a photographic film identification system which automatically generates and applies a unique identifying code to each film strip and its associated container, envelope or label. While Cowles device provides unique identification to the film, Cowles does not provide any type of identification means for the code.

Accordingly, the instant invention overcomes the above mentioned shortcomings by providing an apparatus which couples to a conventional camera providing a means for recording a complete description of the photograph subject matter. The means for recording is indexed according to the film frame and can be printed out in the form of a label for attachment to the photograph front, back, or photo album.

SUMMARY OF THE INVENTION

The instant invention comprises a method and apparatus for photograph identification comprising a data entry apparatus, a means for indexing the data entry apparatus, and a printer. The interfacing photography camera provides a signal that is used to index the data entry system and recording system which is capable of receiving informational input and producing an output corresponding to the indexing location of the film. Preferably the output is to a printer for printing of adhesive tape labels. Conventional cameras offer two kinds of flash terminals capable of indexing the data entry device. A directly coupled contact is available of the hot shoe type and a B type JIS flash terminal is available. The data entry system can be coupled to either the hot shoe or the flash terminal. When the camera produces power for a flash, the triggering device provides the power surge which is translated into an index signal by the data entry system. The index toggles the data entry to a clear screen for acceptance of information regarding the photograph. Data entry is accomplished by means of an input device, preferably a miniaturized keyboard. By use of the keyboard the operator may input information regarding the taking of the photograph. The information is stored within a recording module for later recall. Once the film roll is exhausted, the module containing all the information can be coupled to a printer for printing out on a conventional label printer. Alternatively, the module can be removed for storage or remote label printing.

The printed label is made available for placement on the processed photograph. Unlike the prior art, the printed label is available for placement on the back of the photograph as well as along side the photograph if placed within a photo album. Further, the label may be placed on the front of the photograph in a similar fashion as the photograph printing of the prior art.

Accordingly, a primary object of the present invention is to provide a method of synchronized photograph identification by means of a data entry device coupled to a conventional camera.

Still another object of the instant invention is to provide a means for identifying each photograph at the moment the photograph is taken.

Yet still another object of the instant invention is to provide a device for indexing a microprocessor by translating a signal from the hot shoe or flash terminal contact of a conventional camera.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

BRIEF DESCRIPTION OF THE DRAWINGS

Various other objects, advantages, and features of the invention will become apparent to those skilled in the art from the following discussion taken in conjunction with the following drawings, in which:

FIG. 6 is a flow diagram for the microprocessor of the data entry system of the instant invention.

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
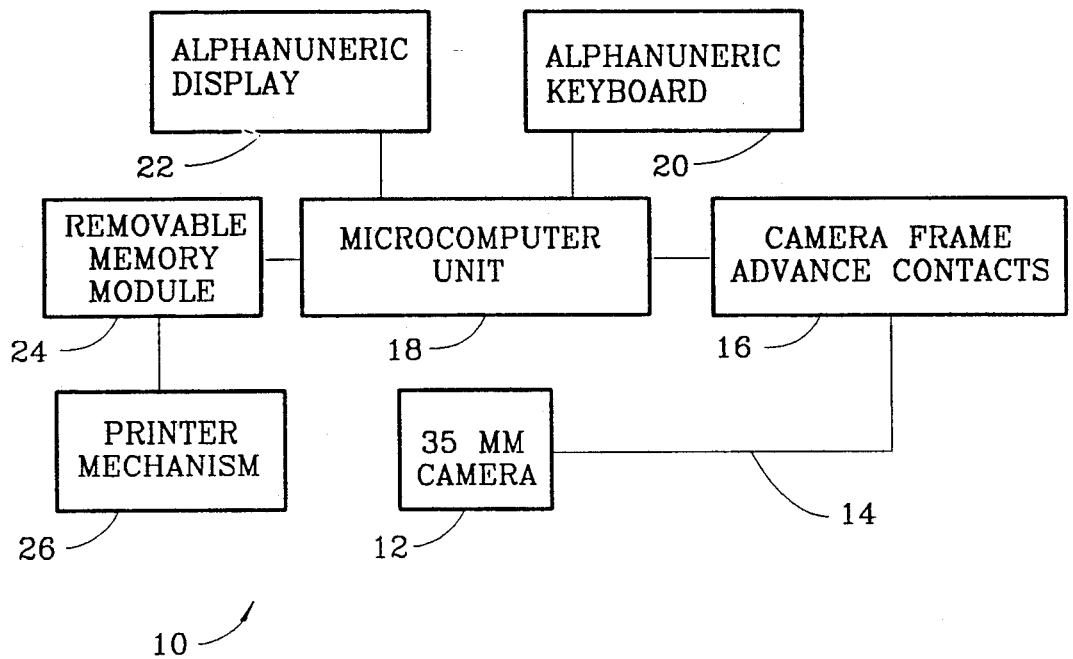
FIG. 1 is a block diagram depicting the elements of the data entry system of the instant invention.

Reference is now made in general to FIG. 1, a block diagram depicting the elements of the synchronized photograph identification system 10 of the instant invention. When a photographer takes a picture, the picture is recorded on film located within a camera 12. Instantly before the taking of the picture, the camera 12 impulses flash contacts to the hot shoe or flash terminal located on the camera frame. The data entry system of the instant invention is coupled to camera 12 by means of a triggering cable 14 wherein the data entry system receives the flash signal and translates the signal into notice of a camera frame advance 16 interpreted by a microprocessor based within the microcomputer 18. The frame advance results in indexing of the recording means making a storage area available for receipt of information by keyboard 20, the input of which is displayed on screen 22 for verification. If the information is acceptable, the photographer can record the information into memory module 24. If the photographer does not input any information, the storage section remains empty and advancement is by the taking of another picture. Information inputed but not saved is saved automatically upon frame advancement. The recorded information can be printed 26 out on labels for placement on the processed photograph. The preferred label has one side surface made of adhesive for placement on the back of the photograph or next to photograph if placed within a photo album.

Figure 2:
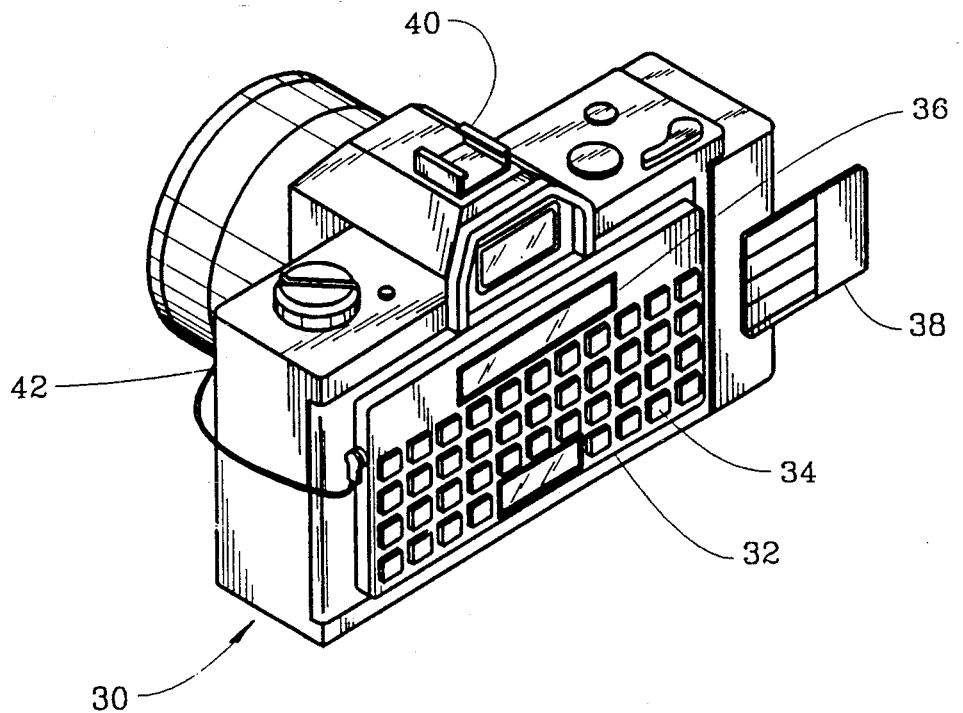
FIG. 2 is a perspective view one embodiment of the data entry system coupled to the back of conventional single lens reflex 35 mm camera.

Now referring to FIG. 2, a conventional camera 30 is shown having microcomputer 32 attached to the back of the camera. The manner of attachment is diverse and variation of which not deemed a limiting factor to this invention. The device can be attached by adhesive, magnets, clips, tri-pod attachment or made part of the camera back. Keyboard 34 of microcomputer 32 is used to input data into the microcomputer with a display 36 provided for verification. Information inputed into the microcomputer 32 is saved on a modular erasable disk 38 for storage or removal to remote printers. The modular disk 38 allows for information storage of multiple photo rolls, alternatively, the modular disk 38 may be maintained with the photo roll for later printing.

Figure 3:
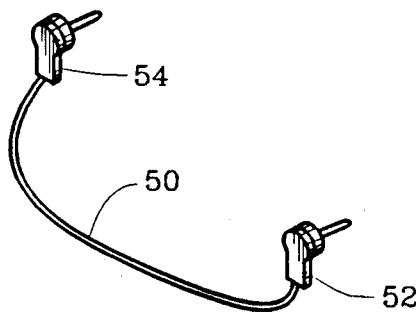
FIG. 3 is an indexing strap for coupling the data entry system to the camera flash terminal.
Figure 3A:
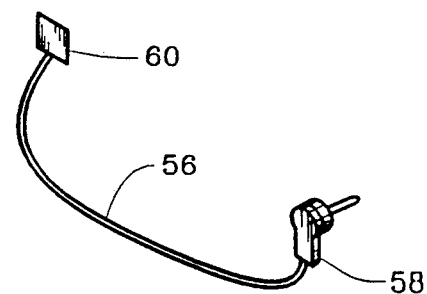
FIG. 3A is an indexing strap for coupling the data entry system to the camera hot shoe.

FIGS. 3 depicts cable 50 with JIS type B terminal 52 and 54 for coupling between the microcomputer 32 and flash terminal 42. When the camera is triggered the flash terminal is energized indexing the recording mechanism of the data entry device. FIG. 3A depicts cable 56 with one JIS type B terminal 58 and a second substantially flat hot shot terminal 60 that will fit within a conventional hot shoe clamp. The hot shoe terminal 60 can be made adaptable to couple between a flash tube, not shown, by us of wafer thin material that will fit between the flash tube housing and the hot shoe 40 clamp.

Figure 4:
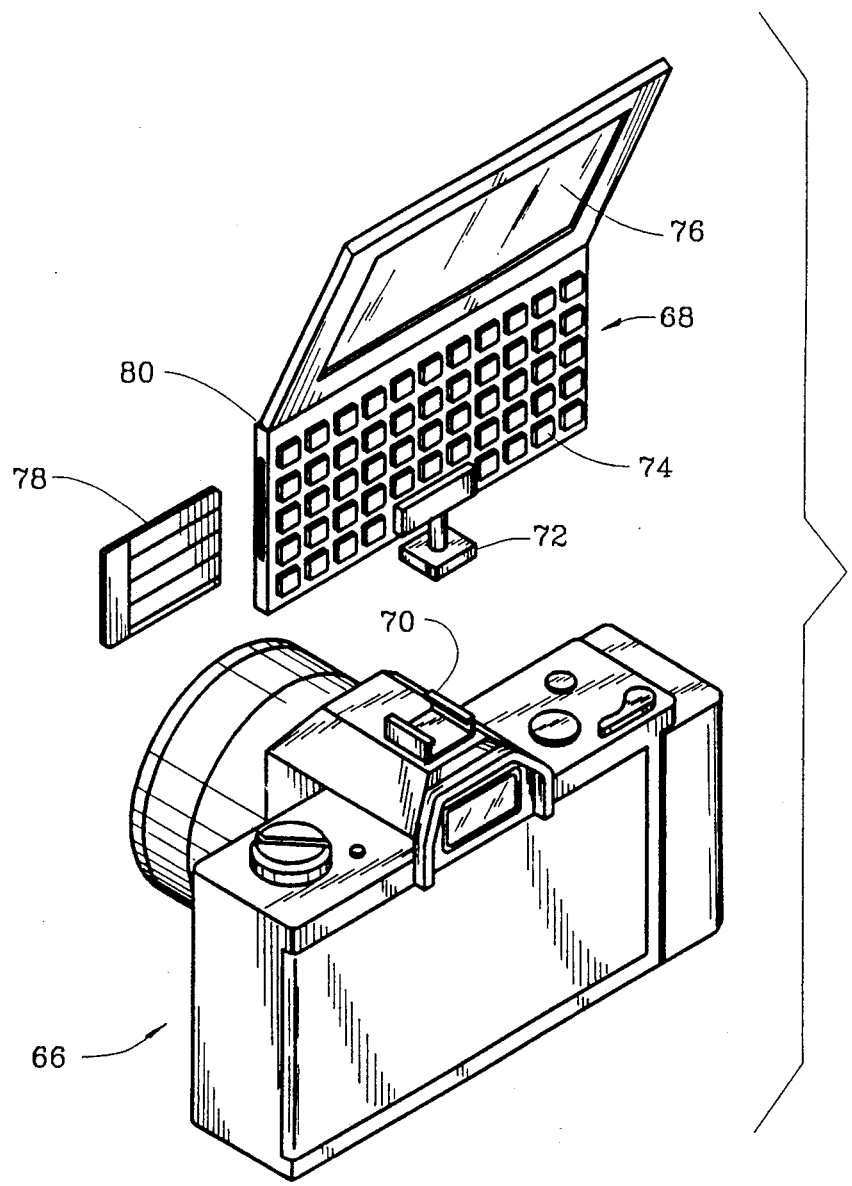
FIG. 4 is a perspective view of a second embodiment of the data entry system coupled to the hot shoe of a conventional single lends reflex 35 mm camera.

FIG. 4 illustrates a second embodiment wherein the data entry system is mounted directly to the hot shoe. Similar to the first embodiment, a conventional camera 66 is shown having microcomputer 68 attachable to the hot shoe 70 of the camera 66 by use of a hot shoe bracket 72. The keyboard 74 is used to input data into the microcomputer 66 with a display 76 provided for verification. Information inputed into the microcomputer 66 is saved on a modular erasable disk 78 for ease of removal. The microcomputer is indexed by flash contacts delivered by hot shoe 70. The display 76 can be folded at hinge 80 to cover the keyboard 74.

Both embodiments provide a method of interfacing a photography camera with a conventional microcomputer for synchronized photograph identification. The method accomplished by attaching a data entry system having a means for recording data to a camera. The data entry system is coupled to a flash terminal of the camera accepting the flash terminal signal providing one-way communication between the camera and data entry system. The signal is converted into an indexing step for advancing the data entry system corresponding to the indexing of the film within the camera. Information can then be placed within the data entry system corresponding to the index location of the film and the data or information stored within a modular removable disk or the like means for recording. The recording is used to provide the data for label printing, the labels corresponding to the indexing data. The labels available for placement corresponding to processed photographs.

Figure 5:
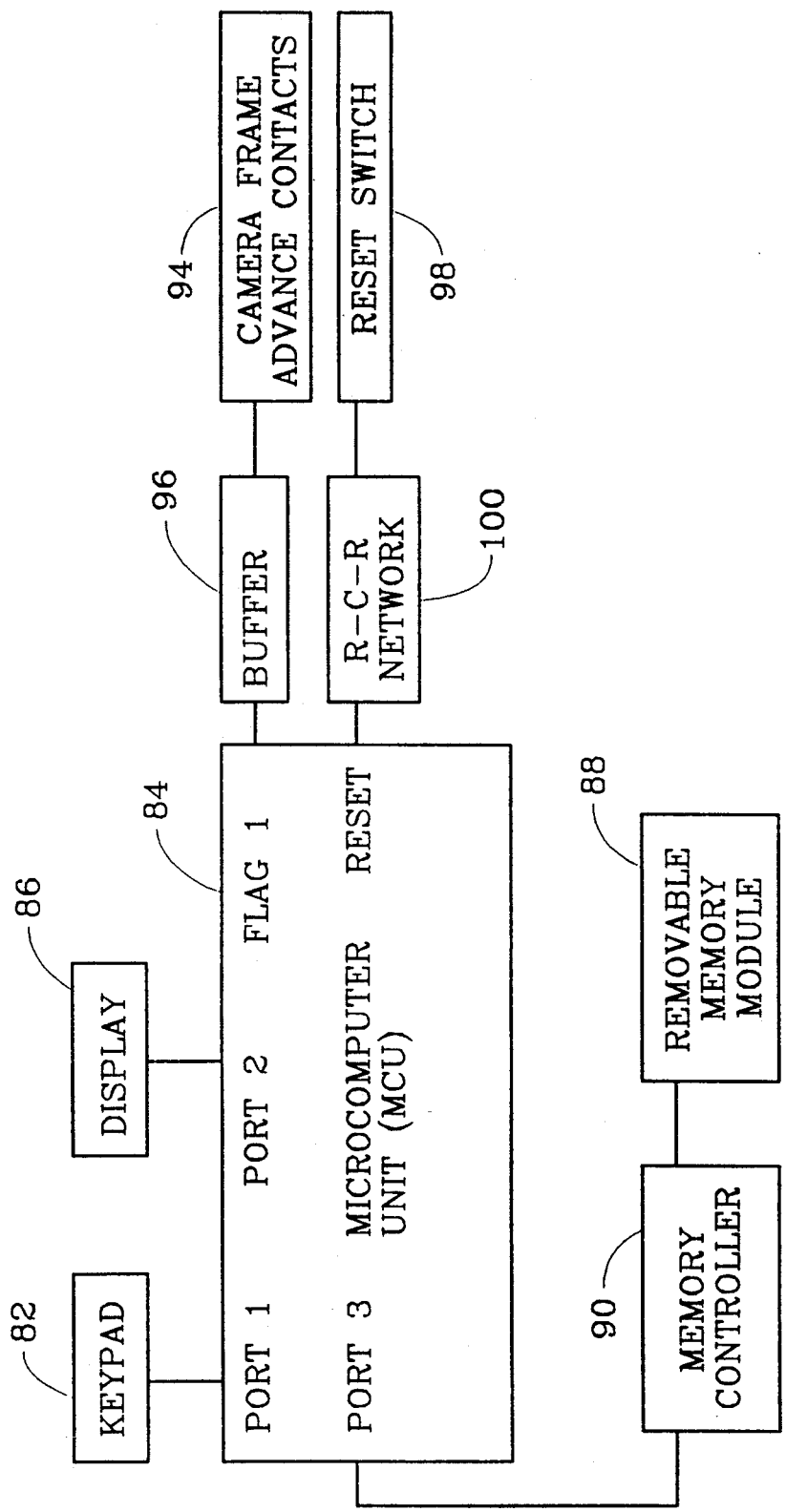
FIG. 5 is a detailed block diagram depicting the elements of the data entry system of the instant invention.

Referring to FIGS. 5 & 6, information and control functions are entered by means of the keypad 82 for manipulation by the microcomputer 84 with user confirmation on a visual display 86. The microcomputer 84 transfers the entry data to a removable memory module 88, described above, by use of a interface controller 90. The transfer of data occurring upon signal by the keypad 82 or automatically by use of the camera frame advance contacts 94 using an optional buffer to handle multiple frame advance signals. Reset of the microcomputer 84 is performed upon start-up or by use of the reset switch 98 through the RCR network 100.

Flow logic for the microcomputer 84 is specifically set forth in FIG. 6 wherein the a preset routine 102 is executed upon depressing of the reset switch 98. The program requesting the operator to enter the time and date 104 and a confirmation of entry 106 and subroutine returns for improper entry before saving of information 108. The microcomputer then requesting the location entry 110 with a confirmation of entry 112 before saving 114 or subroutine return for improper entry. Microcomputer then request comments to be entered 116 with a confirmation of entry 118. The confirmation is saved 120, the improper entry sub-routined back to the request. A final request confirms all entries as correct 124, all entries entered into the microcomputer by use of the carriage return entry. Negation of correctness 126 causes the program to enter an edit mode by returning the operator to a specific correction chart 128, stepping to either second confirmation 130 for confirming allowing decision to edit comments 132, location 134, or return to the date and time entry.

Acceptance of the data at decision point 126 causes the program to store the data 136 within the memory module before checking an auto/manual advance 138 flag 140 which can be set by the Camera Frame Advance contacts 94 wherein a query is displayed 142 for the next frame entry. If the query response 144 is negative the program is routed back to the flag determination 138. If the query response 144 is affirmative the fame number is incremented 146 and the flag 140 toggled to reset. After incrementing 146 the program checks if addition frames are available 148 for return to the time entry 104, or alternatively, for display of new file/new memory cartridge installation 150.

While the invention has been described, disclosed, illustrated, and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

What I claim is:

1. In combination with a camera having at least one flash contact on top of said camera an identification apparatus comprising:

a microcomputer unit having an integrated keyboard and display releasably attached to said camera, said keyboard available for input of indicia for digital storage on a removable memory module, said display providing a visual output of said indica contemporaneously said input;

means for electrically coupling said microcomputer unit to a flash contact of said camera, said flash contact providing a conventional electrical output indexing said microcomputer in relation to film frame advancement causing a portion of said memory module to be made available for receipt of said indicia;

mounting means for mounting said microcomputer unit above said flash contact, said mounting means including a hot shoe terminal slidably insertable into said flash contact and a support means connected between said hot shoe terminal and said microcomputer unit providing support of said microcomputer unit above said flash contact and;

a printing means operatively associated with said memory module available for converting said digital storage of said indicia on a human readable paper tape for attachment to photographs developed from camera film.

2. The combination according to claim 1 wherein said hot shoe terminal channeling a flash signal from said camera to said microcomputer unit.

* * * * *